United States Patent
Sudo

(10) Patent No.: US 6,647,025 B1
(45) Date of Patent: Nov. 11, 2003

(54) OFDM RECEPTION APPARATUS

(75) Inventor: Hiroaki Sudo, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/447,860

(22) Filed: Nov. 23, 1999

(30) Foreign Application Priority Data

Nov. 26, 1998 (JP) ............................................. 10-336111
Mar. 24, 1999 (JP) ............................................. 11-079574

(51) Int. Cl.[7] ............................. H04J 11/00; H04L 7/00
(52) U.S. Cl. ........................ 370/503; 370/208; 375/362
(58) Field of Search ................................ 370/204, 205, 370/208, 210–281, 344, 436, 350–478, 480, 481, 503, 508, 512; 455/66, 143, 137, 139, 192.1, 273, 275; 375/362

(56) References Cited

U.S. PATENT DOCUMENTS

| | | | | |
|---|---|---|---|---|
| 5,602,835 | A | * 2/1997 | Seki et al. | 370/206 |
| 6,169,751 | B1 | * 1/2001 | Shirakata et al. | 370/480 |
| 6,192,056 | B1 | * 2/2001 | Tsuruoka | 370/504 |
| 6,275,523 | B1 | * 8/2001 | Chen et al. | 375/226 |

OTHER PUBLICATIONS

"Synchronization scheme of OFDM systems for high speed wireless LAN" by T. Onizawa et al., published by NTT Wireless Systems Laboratories, pp. 607, 1998.
English Language abstract of "Synchronization scheme of OFDM systems for high speed wireless LAN" by T. Onizawa et al., published by NTT Wireless Systems Laboratories, pp. 607, 1998.

* cited by examiner

*Primary Examiner*—Steven Nguyen
*Assistant Examiner*—Duc Duong
(74) *Attorney, Agent, or Firm*—Greenblum & Bernstein, P.L.C.

(57) ABSTRACT

Multiplier 103 calculates the correlation value of the received signal with the one-symbol-delayed received signal, integrator 104 integrates the calculated correlation value, subtracter 105 executes subtract processing between the integrated value and an arbitrary threshold level, and decider 106 decides a level of the resultant, fastest timing detection section 107 compares the peak detected timing for each of a plurality of frames received during a predetermined time to each other to select the fastest peak detected timing, and using the selected timing as a processing initiation timing, FFT circuit 108 executes FFT processing on the received signal.

14 Claims, 11 Drawing Sheets

OFDM RECEPTION APPARATUS

BACKGROUND OF THE INVENTION

1. Field of the Invention

The present invention relates to an OFDM (Orthogonal Frequency Division Multiplexing) reception apparatus, and more particularly, to an OPDM reception apparatus in a mobile communication and a symbol synchronization error reduction method therefor.

2. Description of the Related Art

A conventional OFDM reception apparatus is explained below using FIG. 1 to FIG. 4. FIG. 1 is a schematic block diagram illustrating a part of a configuration of the conventional OFDM reception apparatus. FIG. 2 is a schematic block diagram illustrating a part of another configuration of the conventional OFDM reception apparatus. FIG. 3 is a schematic diagram illustrating a frame structure of a transmission signal in an OFDM system. FIG. 4 is a schematic diagram illustrating a correlation value calculation result in the OFDM reception apparatus.

The configuration of the conventional OFDM reception apparatus and an acquisition method for symbol synchronization timing therein are explained first using FIG. 1.

In FIG. 1, A/D converter 1 converts a received signal from an analog signal to a digital signal. Delayer 2 delays the received signal which is converted into the digital signal (hereinafter, also referred to as received digital signal) by one symbol. Multiplier 3 executes complex multiplication processing between the received digital signal and the received signal delayed by one symbol in delayer 2 (hereinafter, also referred to as one-symbol-delayed received signal).

Integrator 4 integrates outputs from multiplier 3. Subtracter 5 processes the subtraction between an output from integrator 4 and a threshold level. Decider 6 decides whether an output from subtracter 5 is positive or negative. For example, in the case where such an output is positive, it is determined that the integrated result exceeds the threshold level, and the timing having such an integrated result is used as a processing timing for FFT which is descried below.

FFT circuit 7 executes fast Fourier transform (FFT) processing on the received digital signal. The FFT processing in FFT circuit 7 is initiated based on an output from decider 6, i.e., the processing initiation timing.

Demodulator 8 executes demodulation processing on an output signal from FFT circuit 7. Decider 9 executes a decision on an output signal from demodulator 8.

Operations in the OFDM reception apparatus with the configuration as described above are next explained. The received signal generally has a frame structure as illustrated in FIG. 3. In such a e frame structure, guard interval 42, with the same signal as the end portion of effective symbols, is provided before effective symbol 41 for the purpose of canceling a delayed version, and phase reference symbol (pilot symbol) 43 and synchronization symbol 44, which is the same signal as phase reference symbol 43, are provided at the head of signals (before the guard interval).

The received signal, which is converted into the digital signal in A/D converter 1, is delayed by one symbol in delayer 2. Multiplier 3 obtains the correlation value of the received signal with the one-symbol-delayed received signal.

Since the same signal as phase reference symbol 43 is provided as synchronization symbol 44 before phase reference symbol 43, as illustrated in FIG. 4, the correlation value calculated in multiplier 3 has the peak at a position which is the end portion of the phase reference symbol of the received signal and the end portion of the synchronization symbol of the one-symbol-delayed signal (head of phase reference symbol 43). Therefore, by the use of subtracter 5 and decider 6, it is possible to detect the peak of the correlation value by comparing the output from integrator 4 to the threshold level.

The symbol synchronization timing, which is an output from decider 6, is input to FFT circuit 7 as a FFT processing initiation trigger.

The received signal subjected to the FFT processing in FFT circuit 7 is output to demodulator 8 to be demodulated therein, and then decided in decider 9 to be a demodulated signal.

The case where the diversity is performed on received signals from a plurality of branches is next described using FIG. 2.

In FIG. 2, A/D converters 11 and 12 respectively convert received signal 1 from branch 1 and received signal 2 from branch 2 each from the analog signal to the digital signal. Delayers 13 and 14 respectively delay received digital signals 1 and 2 each by one symbol. Multipliers 15 and 16 execute complex multiplication processing between received digital signals 1 and 2, and received signals 1 and 2 which are delayed by one symbol in delayers 403 and 404, respectively.

Integrators 17 and 18 integrate respective outputs from multipliers 15 and 16. Subtracters 17 and 18 execute subtraction processing between respective outputs from integrators 17 and 18 and a threshold level. Deciders 21 and 22 decide whether respective outputs from subtracters 19 and 20 are positive or negative. For example, in the case where such an output is positive, it is determined that the integrated result exceeds the threshold level, and the timing having such an integrated result is used as a processing timing for FFT which is descried below.

FFT circuits 23 and 24 execute respectively fast Fourier transform (FFT) processing on received digital signals 1 and 2. The FFT processing in FFT circuits 23 and 24 is initiated based on respective outputs from deciders 21 and 22, i.e., the processing initiation timing.

Selector 25 selects an output from FFT circuit 23 or 24 to output corresponding to received levels of received signals 1 and 2. Demodulator 26 demodulates an output signal from selector 25. Decider 27 executes a =decision on an output signal from demodulator 26.

Arc tangent calculators 28 and 29 execute arc tangent calculation on respective output signals from integrators 17 and 18. Averager 30 averages outputs from arc tangent calculators 28 and 29.

Operations in the OFDM reception apparatus with the configuration as described above are next explained.

Received signals 1 and 2 received in branches 1 and 2 are converted into digital signals in A/D converters 11 and 12, and then are delayed each by one symbol in delayers 13 and 14, respectively. Multipliers 15 and 16 obtain the correlation values of the respective received signals with the respective one-symbol-delayed received signals.

With respect to the correlation values calculated for the received signals in respective branches, by the use of subtracters 19 and 20, and deciders 21 and 22, respectively, the peaks are detected by comparing respective outputs from multipliers 17 and 18 to a threshold level.

The symbol synchronization timings, which are the outputs from deciders 21 and 22, are input to FFT circuits 23 and 24, respectively, each as a FFT processing initiation trigger.

With respect to received signals 1 and 2 subjected to the FFT processing in FFT circuits 23 and 24, selector 25 selects either of received signal 1 or 2, of which the received level is higher than the other, to output to demodulator 26. The received signal, which is selected in selector 25 and input to demodulator 26, is demodulated in demodulator 26, and then decided in decider 27 to be a demodulated signal.

On the other hand, output signals from integrators 17 and 18 are subjected to arc tangent calculation respectively in arc tangent calculators 28 and 29, so as to calculate respective phase rotation amounts of received signals in respective branches. Averager 30 averages the respective phase rotation amounts of received signals in respective branches to output. Phase rotation amount $\Delta f$, which is an output from averager 30, is used as a frequency offset amount to be compensated in the frequency offset compensation in the quasi-coherent detection.

As descried above, the conventional OFDM reception apparatus calculates the correlation value of the received signal with the one-symbol-delayed received signal, detects the peak of the correlation value, and obtains the timing, at which the peak is detected, as the symbol synchronization timing, which is used as the timing for FFT processing initiation for the received signal. Further, in the diversity, the branch with the highest received level is selected.

However, in the conventional OFDM reception apparatus, there is a problem that error rate characteristics deteriorate greatly under multipath environments where the symbol synchronization timing tends to be acquired behind an actual timing.

In other words, in the conventional OFDM reception apparatus, since the guard interval is proved before the effective symbols, the effective symbols are extracted without any problems in the case where the symbol synchronization timing is acquired faster than the actual timing. However, in the case where the synchronization is acquired at a timing slower than the actual timing, interference occurs and the error rate characteristics deteriorate greatly.

SUMMARY OF THE INVENTION

An object of the present invention is to provide an OFDM reception apparatus which improves the accuracy for the symbol synchronization acquisition, and further improves the error rate under multipath environments.

A gist of the present invention is to use the peak detected timing for a frame of which the peak of the correlation value is detected fastest among a plurality of frames received during a predetermined time, as the symbol synchronization timing which is the timing for FFT processing initiation, and in the diversity, to use the peak detected timing for a received signal in a branch of which the peak of the correlation value is detected fastest among all received signals, as the symbol synchronization timing which is the timing for FFT processing initiation common to received signals in all branches.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Embodiments of the present invention are described specifically below with reference to drawings.

First Embodiment

An OFDM reception apparatus according to this embodiment uses, as the symbol synchronization timing, the timing for a frame of which the symbol synchronization is acquired at the fastest timing among a plurality of frames received during a predetermined time.

Figure 1:
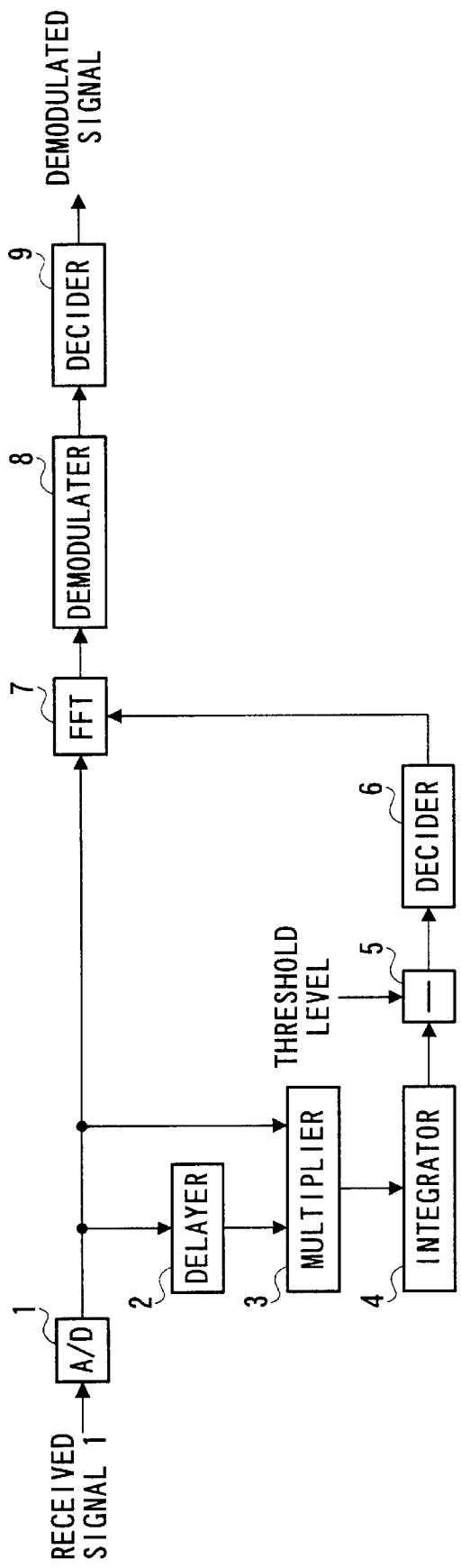
FIG. 1 is a schematic block diagram illustrating a part of a configuration of a conventional OFDM reception apparatus.
Figure 2:
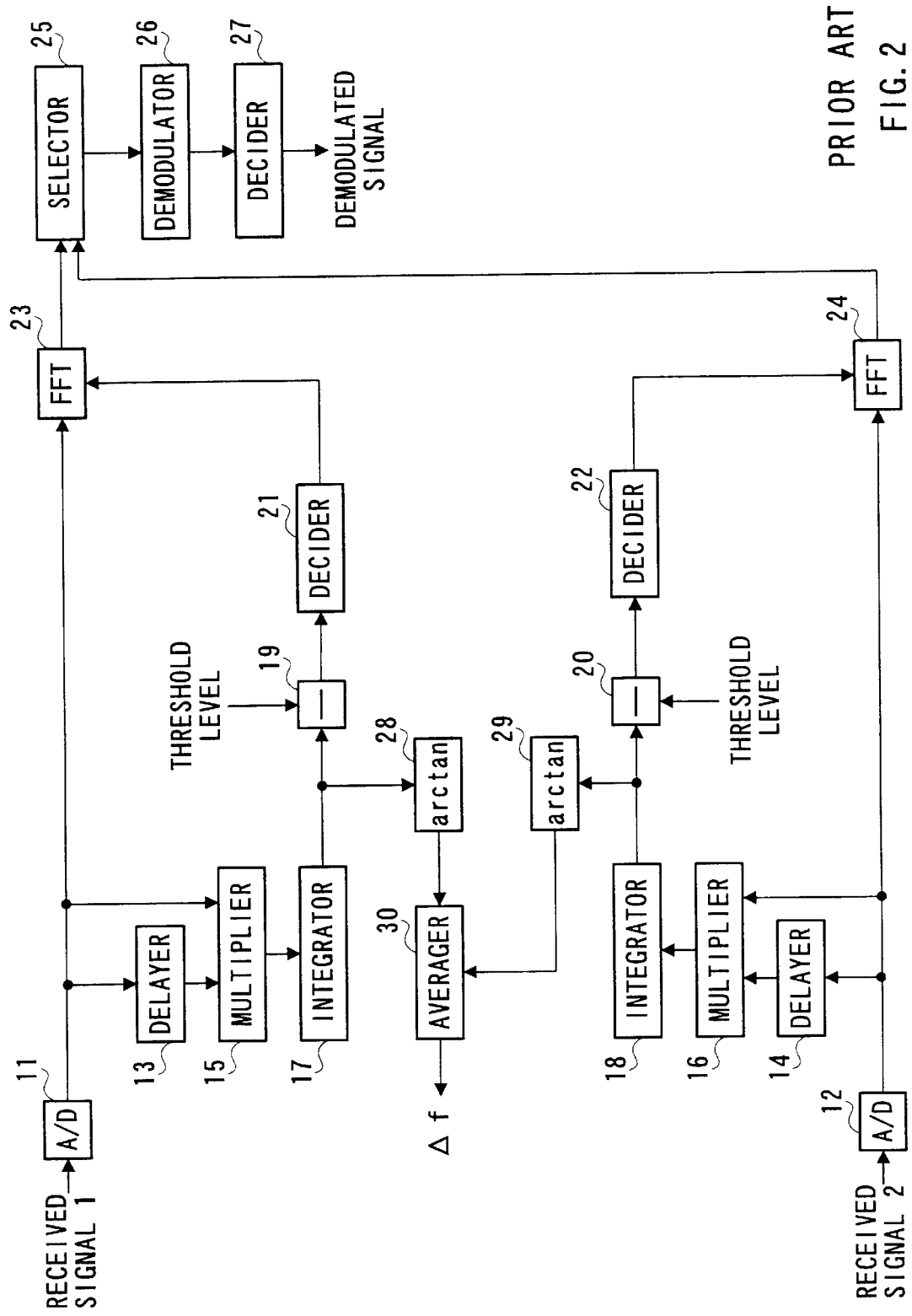
FIG. 2 is a schematic block diagram illustrating a part of another configuration of the conventional OFDM reception apparatus.
Figure 3:
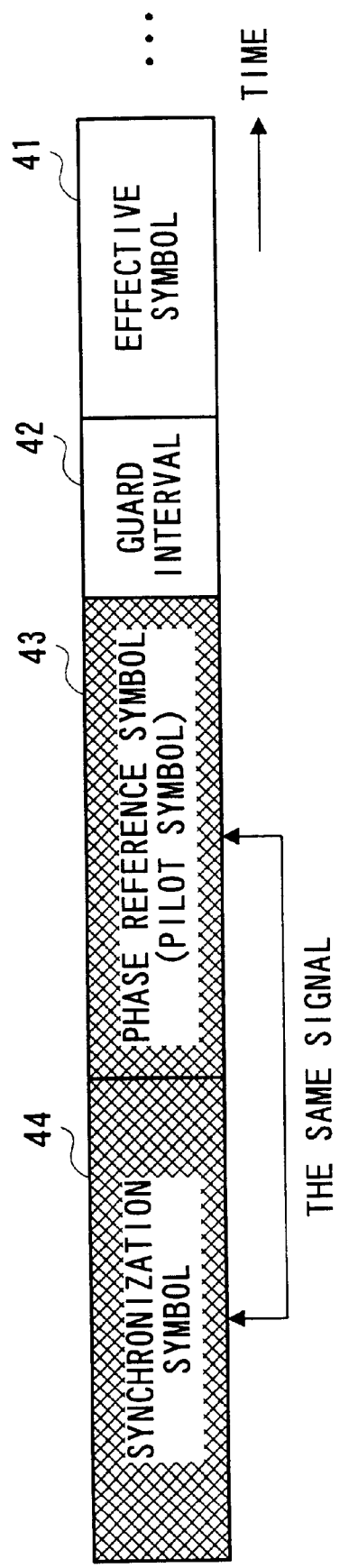
FIG. 3 is a schematic diagram illustrating a frame structure of a transmission signal in an OFDM system.
Figure 4:
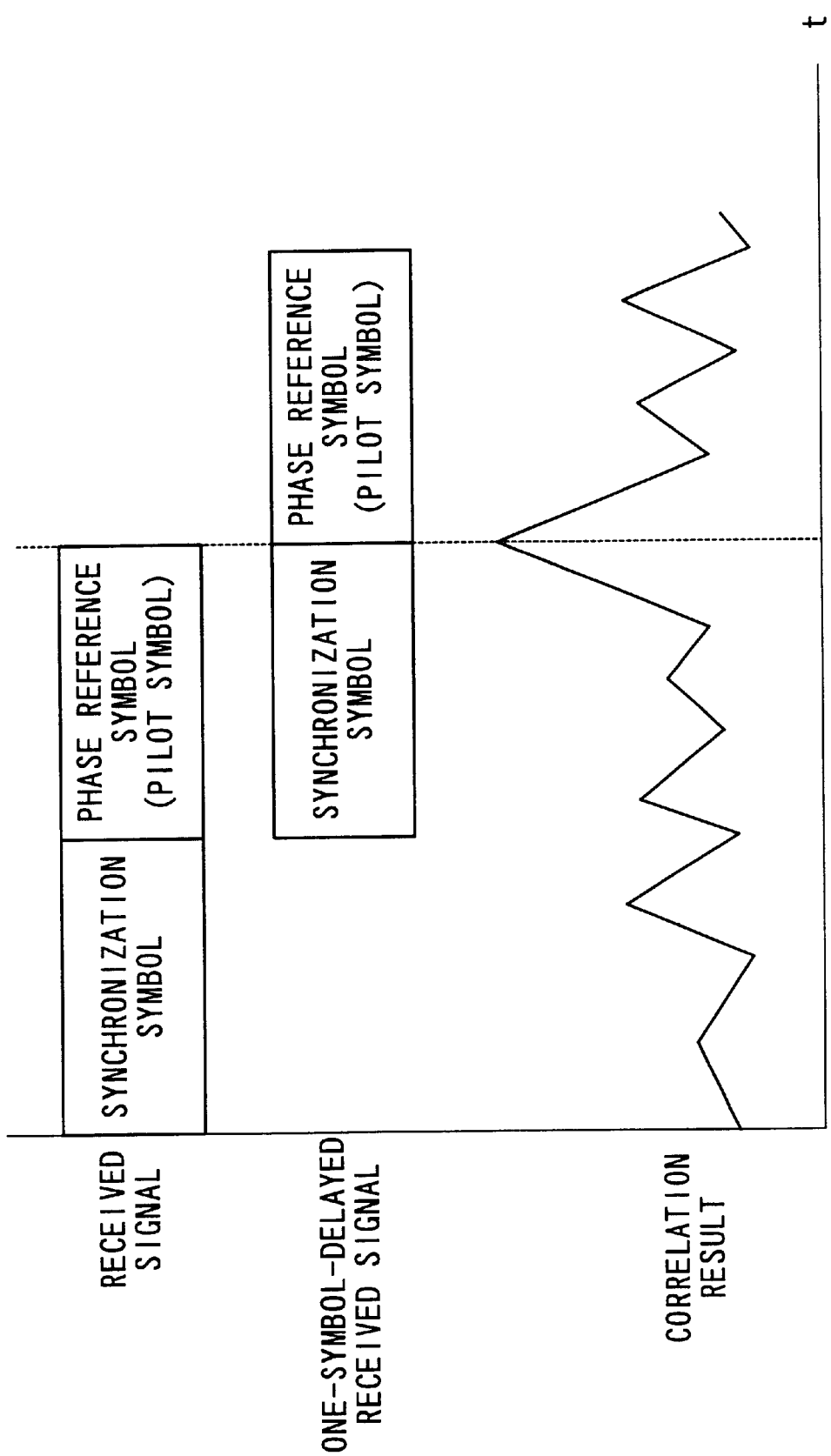
FIG. 4 is a schematic diagram illustrating a correlation value calculation result in the OFDM reception apparatus.
Figure 5:
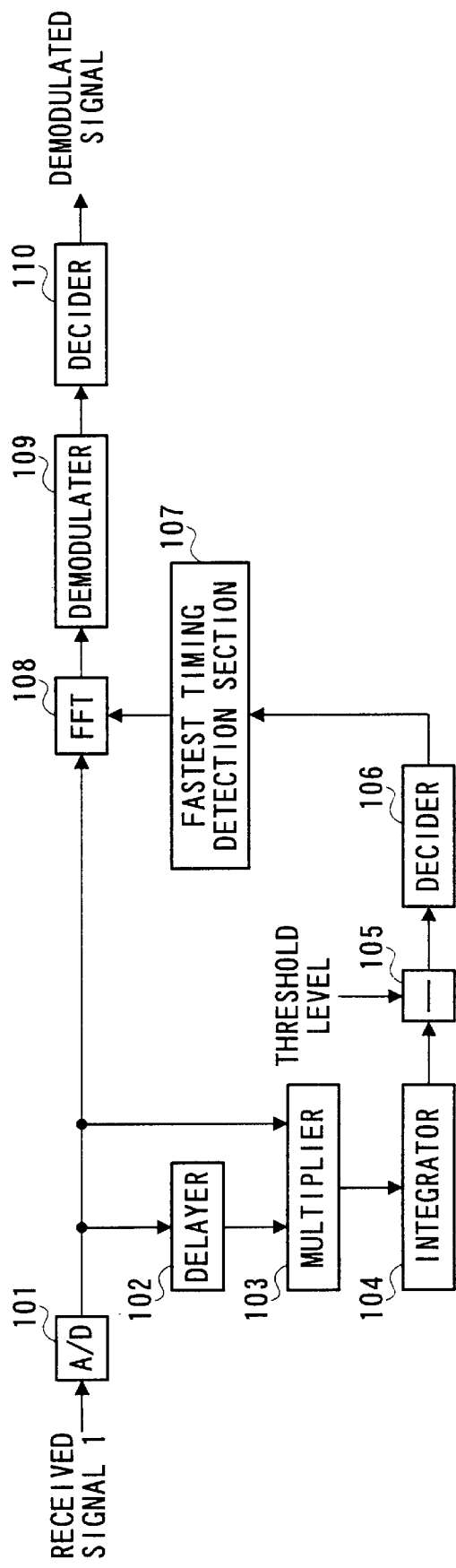
FIG. 5 is a schematic block diagram illustrating a part of a configuration of an OFDM reception apparatus according to a first embodiment of the present invention.
Figure 6:
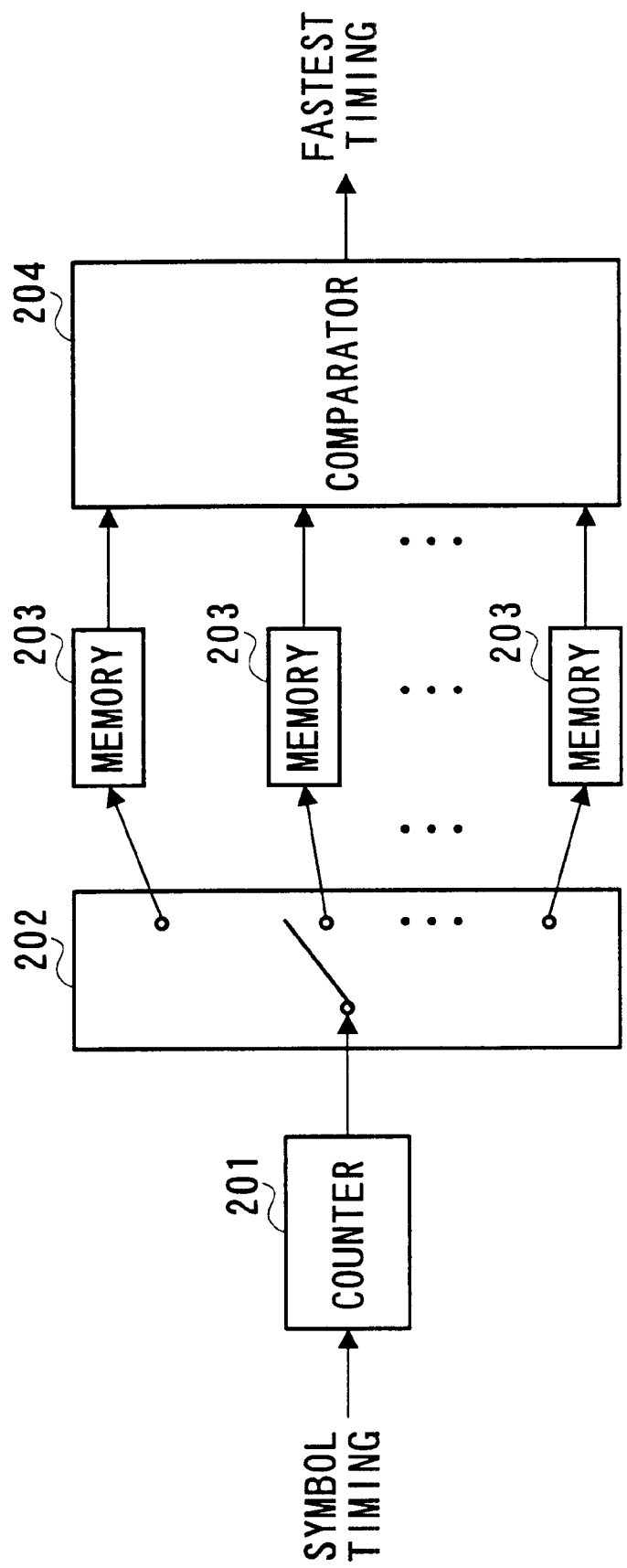
FIG. 6 is a schematic block diagram illustrating a part of a configuration of a fastest timing detection section in the OFDM reception apparatus according to the first embodiment of the present invention.

The OFDM reception apparatus according to this embodiment is explained below using FIG. 5 and FIG. 6. FIG. 5 is a schematic block diagram illustrating a part of a configuration of the OFDM reception apparatus according to the first embodiment of the present invention, and FIG. 6 is a schematic block diagram illustrating a part of a configuration of a fastest timing detection section in the OFDM reception apparatus according to the first embodiment of the present invention.

A/D converter 101 converts a received signal from an analog signal to a digital signal. Delayer 102 delays the received signal which is converted into the digital signal by one symbol. Multiplier 103 executes complex multiplication processing between the received digital signal and the received signal delayed by one symbol in delayer 102.

Integrator 104 integrates outputs from multiplier 103. Subtracter 105 processes the subtraction between an output from integrator 104 and a threshold level. Decider 106 decides whether an output from subtracter 105 is positive or negative. For example, in the case where such an output is positive, it is determined that the integrated result exceeds the threshold level, and the timing having such an integrated result is used as a processing timing for FFT which is descried below.

With respect to a plurality of frames received during a predetermined time, fastest timing detection section 107 compares outputs from decider 106, selects a frame of which the peak of the correlation value is detected at the fastest timing, and outputs the peak timing of the selected frame as the symbol synchronization timing to FFT circuit 108. In addition, the above-mentioned predetermined time is determined arbitrary. Fastest timing detection section 107 is described specifically later.

FFT circuit 108 executes fast Fourier transform (FFT) processing on the received digital signal. The FFT processing in FFT circuit 108 is initiated based on an output from fastest timing detection section 107, i.e., the processing initiation timing.

Demodulator 109 executes demodulation processing on an output signal from FFT circuit 108. Decider 110 executes a decision on an output signal from demodulator 109.

Fastest timing detection section 107 is next described specifically using FIG. 6.

Fastest timing detection section 107 is, As illustrated in FIG. 6, composed of counter 201, switch 202, a plurality of memories 203, and comparator 204.

Counter 201 has an operation period equal to a frame length, suspends the counting operation at the peak detected timing for each frame of the received signal, which is output from decider 106, and holds the counted numerical value obtained at the suspended time.

Switch 202 switches the counted numerical value for each frame to output to respective different memory 203.

Each memory 203 stores the counted numerical value for respective frame. The number of memories 203 is determined so as to enable the storage of the number of frames received during a predetermined time which is directed by fastest timing detection section 107. For example, when it is assumed that the predetermined time directed by fastest timing detection section is 1 msec, and that average 4 frames are received during 1 msec, the number of memories 203 to be provided is equal to or more than 4.

Comparator 204 reads counted numerical values for respective frames stored in respective memories 203 to compare, and outputs the least numerical value thereamong. The counted value output from comparator 204 is used as the symbol synchronization timing, and further as the FFT processing initiation timing.

Operations in the OFDM reception apparatus with the configuration as described above are next explained.

The received signal is converted into the digital signal in A/D converter 101, and then delayed by one symbol in delayer 102. Multiplier 103 calculates the correlation value of the received signal with the one-symbol-delayed received signal.

Integrator 104 integrates the calculated correlation value, subtracter 105 processes the subtraction between the integrated value and the threshold level, and decider 106 executes a decision on the resultant, thus making it possible to detect the peak of the correlation value for each frame of the received signal.

With respect to the peaks of the correlation values output from decider 106, fastest timing detection section 107 compares the peak detected timing for each of a plurality of frames received during the predetermined time to each other to select the fastest peak detected timing.

The received signal subjected to A/D conversion is subjected to FFT processing in FFT circuit 108 using the timing output from comparator 204 as the processing initiation timing.

The received signal subjected to the FFT processing is output to demodulator 109, demodulated in demodulator 109, and decided in decider 110 to be a demodulated signal.

As described above, according to this embodiment, among the timings for the peaks of the correlation values detected for a plurality of frames received during a predetermined time, the fastest timing is used as the symbol synchronization timing, thereby preventing the symbol synchronization timing from being shifted behind the actual timing, and further improving the acquisition accuracy for symbol synchronization timing. As a result, it is possible to improve the error rate under the multipath environments.

Second Embodiment

An OFDM reception apparatus according to this embodiment has the same configuration as that in the first embodiment, except a reduced memory capacity in a fastest timing detection section.

Figure 7:
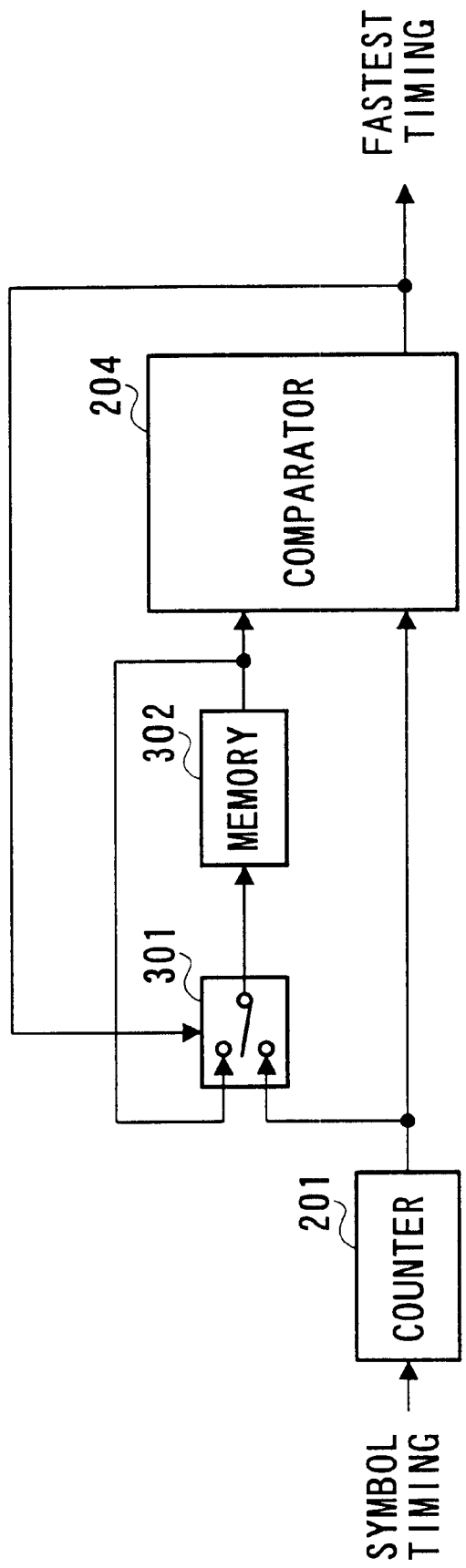
FIG. 7 is a schematic diagram illustrating a part of a configuration of a fastest timing detection section in the OFDM reception apparatus according to the second embodiment of the present invention.

The OFDM reception apparatus according this embodiment is explained below using FIG. 7. FIG. 7 is a schematic block diagram of a part of a configuration of the fastest timing detection section in the OFDM reception apparatus according to the second embodiment of the present invention. In addition, the same blocks as those in the first embodiment are given the same symbols to omit detailed explanations.

In FIG. 7, counter 201 outputs the counted numerical value for the peak detected timing for each frame of the received signal sequentially in the same way as in the first embodiment.

Switch 301 outputs, based on an output from comparator 204, either of the counted numerical value counted in counter 201 or that already stored in memory 302, which is smaller than the other, to memory 302 to be stored.

Comparator 204 compares the counted numerical value stored in memory 302 to that output from counter 201 to output a smaller value.

As described above, according to this embodiment, whenever the fastest timing appears, the fastest timing detection section stores such a timing to use the symbol synchronization timing, thereby improving the accuracy for the symbol synchronization acquisition, while reducing the memory capacity, and enabling the apparatus to be miniaturized and light-weighted.

The third to fifth embodiments below describe about the case where the diversity is performed.

Third Embodiment

An OFDM reception apparatus according to this embodiment uses the symbol synchronization timing for a received signal in a branch of which the symbol synchronization is acquired at the fastest timing, as the symbol synchronization timing for received signals in all branches,.

Figure 8:
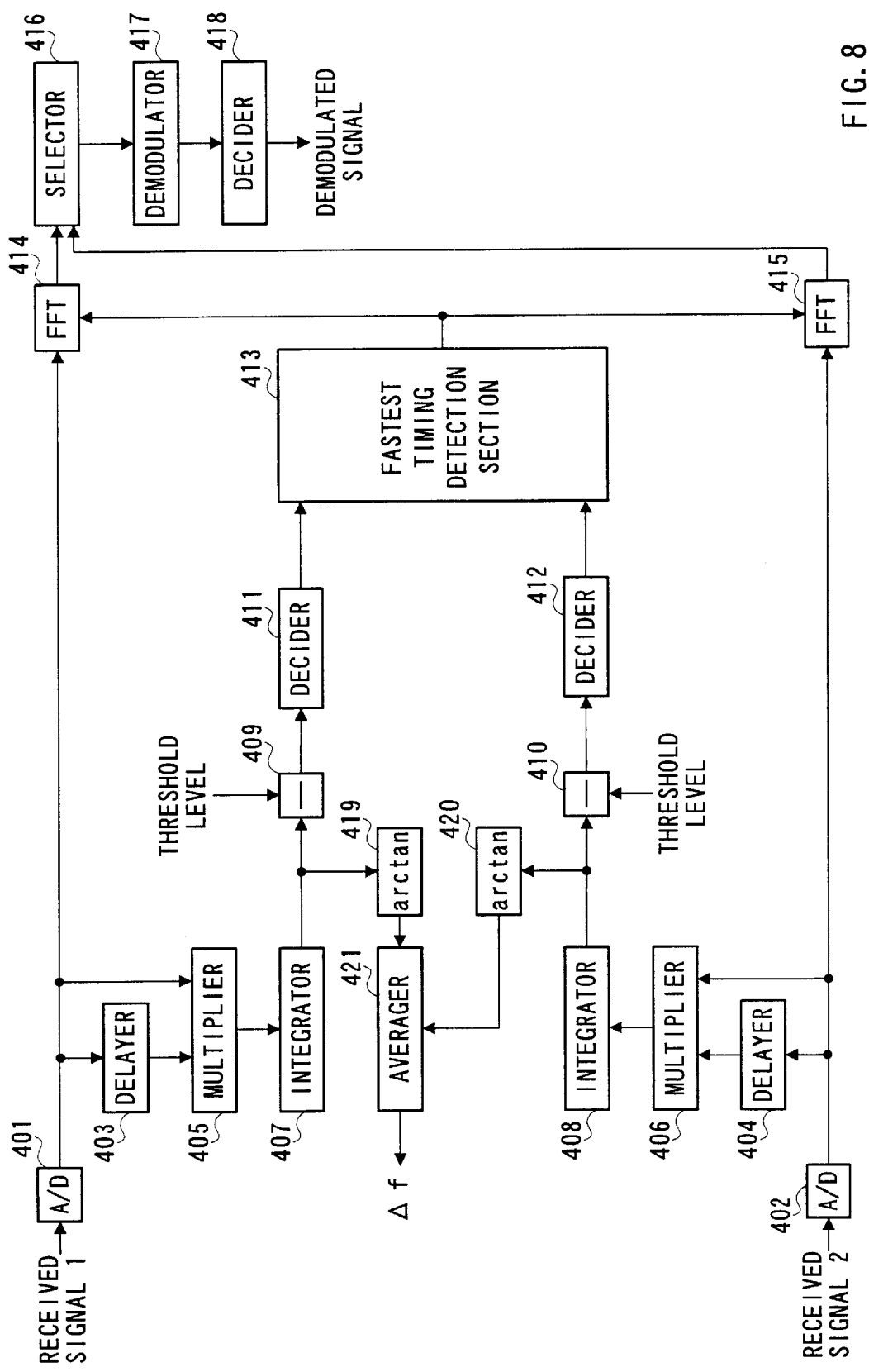
FIG. 8 is a schematic block diagram illustrating a part of a configuration of an OFDM reception apparatus according to a third embodiment of the present invention.

The OFDM reception apparatus according to this embodiment is explained below using FIG. 8. FIG. 8 is a schematic block diagram illustrating a part of a configuration of the OFDM reception apparatus according to the third embodiment of the present invention.

A/D converters 401 and 402 respectively convert received signal 1 from branch 1 and received signal 2 from branch 2 each from the analog signal to the digital signal. Delayers 403 and 404 respectively delay received digital signals 1 and 2 each by one symbol. Multipliers 405 and 406 execute complex multiplication processing between received digital signals 1 and 2, and received signals 1 and 2 which are delayed by one symbol in delayers 403 and 404, respectively.

Integrators 407 and 408 integrate respective outputs from multipliers 405 and 406. Subtracters 409 and 410 execute subtraction processing between respective outputs from integrators 407 and 408 and a threshold level. Deciders 411 and 412 decide whether respective outputs from subtracters 409 and 410 are positive or negative. For example, in the case where such an output is positive, it is determined that the integrated result exceeds the threshold level, and the timing having such an integrated result is used as a processing timing for FFT which is descried below.

Fastest timing detection section 413 compares an output from decider 411 to an output from decider 412 to select the symbol synchronization timing which is acquired at a faster timing, and outputs the selected timing, as the symbol synchronization timing common to received signals in both branches, to both FFT circuits 414 and 415.

Fastest timing detection section 413 has counters 501 and 502 which are provided for respective branches, and operate in a predetermined arbitrary period, comparator 503 which compares counted vales by counters 501 and 502, and selector 504 which selects a branch with the smallest counted value.

FFT circuits 414 and 415 execute respectively fast Fourier transform (FFT) on received digital signals 1 and 2. The FFT processing in FFT circuits 414 and 415 is initiated based on respective outputs from deciders 411 and 412, i.e., the processing initiation timing.

Selector 416 selects an output from FFT circuit 414 or 415 to output corresponding to received levels of received signals 1 and 2. Demodulator 417 demodulates an output signal from selector 416. Decider 418 executes a decision on an output signal from demodulator 417.

Arc tangent calculators 419 and 420 execute arc tangent calculation on respective output signals from integrators 407 and 408 in the same way as in conventional case. Averager 421 averages outputs from arc tangent calculators 419 and 420.

Operations in the OFDM reception apparatus with the configuration as described above are next explained.

Received signals 1 and 2 received in branches 1 and 2 are converted into digital signals in A/D converters 401 and 402, and then are delayed each by one symbol in delayers 403 and 404, respectively. Multipliers 405 and 406 calculate the correlation values of the respective received signals with the respective one-symbol-delayed received signal.

Integrators 407 and 408 integrate the calculated correlation values, subtracters 409 and 410 execute subtract processing between the respective integrated values and the threshold level, and deciders 411 and 412 execute a decision on respective resultants, thus making it possible to detect the respective peaks of the correlation values for received signals 1 and 2.

Figure 9:
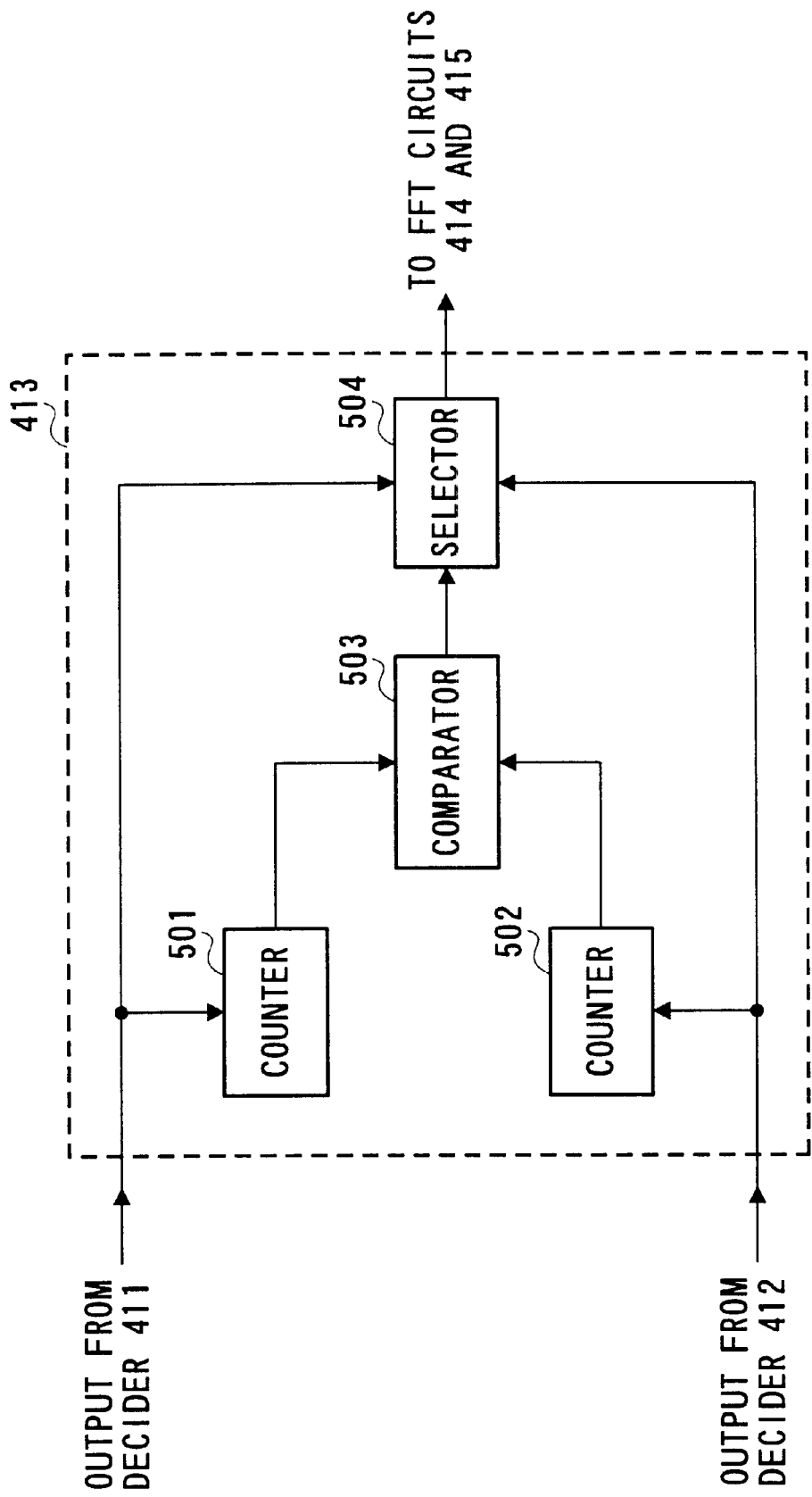
FIG. 9 is a schematic block diagram illustrating a part of a configuration of a fastest timing detection section in the OFDM reception apparatus according to the third embodiment of the present invention.

With respect to the peaks of the correlation values output from deciders 411 and 412, fastest timing detection section 407 compares the timing for the peak to each other to select either one acquired at a faster timing. In other words, in FIG. 9, counters 501 and 502 each operates at a sampling rate, and suspends the counting by respective outputs from deciders 411 and 412, and holds the counted numerical value obtained at the suspended time. Comparator 503 compares the numerical value held at the counting suspended time by counter 501 to that by counter 501 to output to selector 504.

Selector 504 selects an output from decider 411 or 412 for which the counted value held in counter 501 or 502 at the counting suspended time is smaller than the other one, corresponding to an output from comparator 503, so as to output to both FFT circuits 414 and 415.

The thus selected timing is used as the symbol synchronization timing common to received signals in both branches, i.e., the FFT processing initiation timing common to both FFT circuits 414 and 415 which execute FFT processing respectively on received signals 1 and 2.

The received digital signals 1 and 2 are subjected to the FFT processing respectively in FFT circuits 414 and 415 using the control signal form fastest timing detection section 413 as a FFT processing initiation trigger.

With respect to received signals 1 and 2 subjected to the FFT processing, selector 416 selects either of received signal 1 or 2, of which the received level is higher than the other, to output to demodulator 417. The received signal, input to demodulator 417, is demodulated therein, and then decided in decider 418 to be a demodulated signal.

On the other hand, output signals from integrators 407 and 408 are subjected to arc tangent calculation respectively in arc tangent calculators 419 and 420, so as to calculate respective phase rotation amounts of received signals in respective branches. Averager 421 averages the phase rotation amounts of received signals in respective branches to output. Phase rotation amount $\Delta f$, which is an output from averager 421, is used as a frequency offset amount to be compensated in the frequency offset compensation in the quasi-coherent detection.

As described above, according to this embodiment, the symbol synchronization for a received signal in a branch, which is acquired at the fastest timing, is used as the symbol synchronization timing common to received signals in all branches, thereby preventing the symbol synchronization timing from being shifted behind the actual timing, and further improving the acquisition accuracy for symbol synchronization timing. As a result, it is possible to improve the accuracy for the diversity under the multipath environments.

Fourth Embodiment

An OFDM reception apparatus according to this embodiment has almost the same configuration as that in the third embodiment, and uses phase rotation amount $\Delta f$ of a received signal in a branch of which the symbol synchronization is acquired at the fastest timing.

Figure 10:
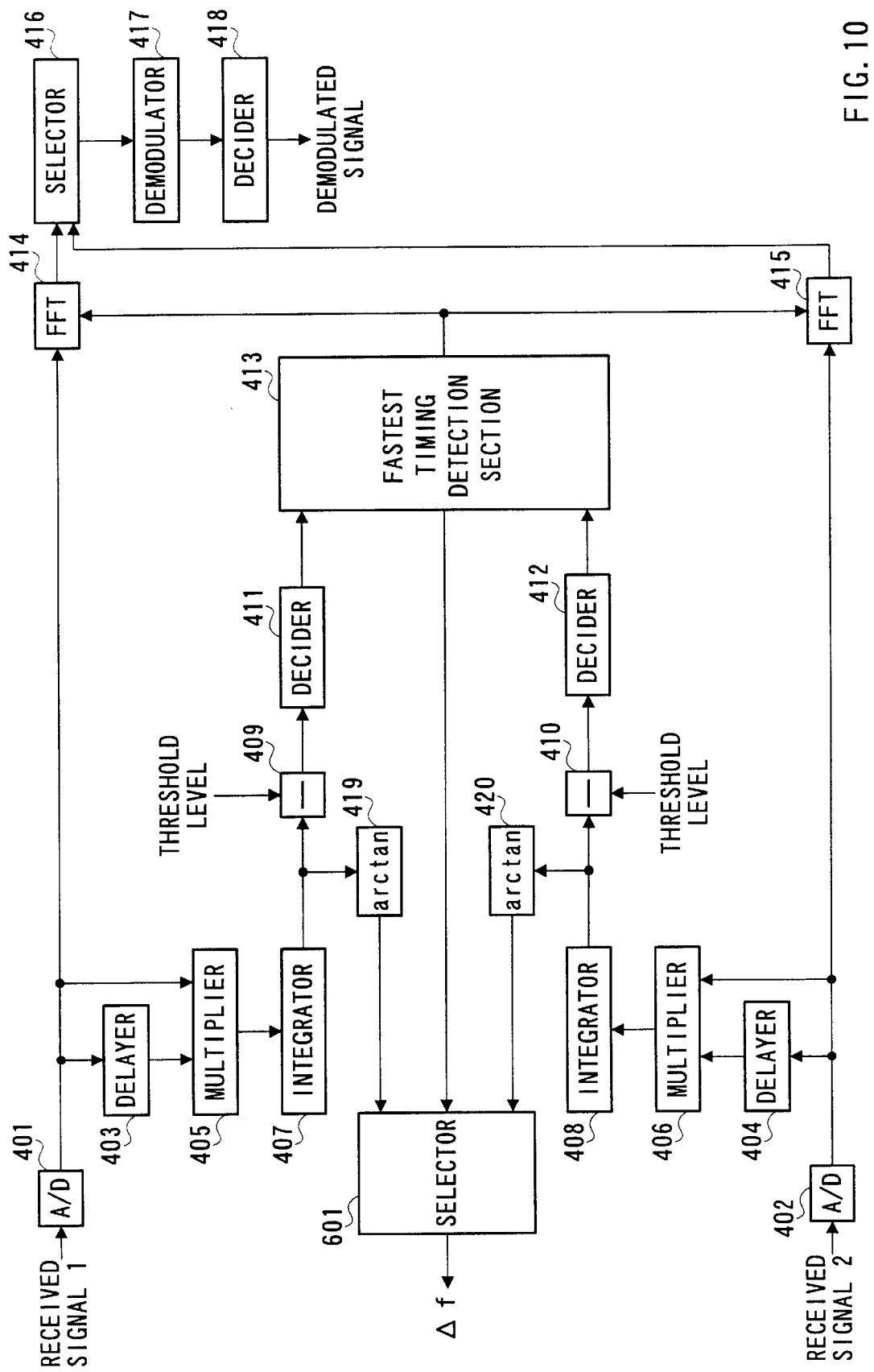
FIG. 10 is a schematic block diagram illustrating a part of a configuration of an OFDM reception apparatus according to a fourth embodiment of the present invention.

The OFDM reception apparatus according this embodiment is explained below using FIG. 10. FIG. 10 is a schematic block diagram of a part of a configuration of the OFDM reception apparatus according to the fourth embodiment of the present invention. In addition, in FIG. 10, the same blocks as those in FIG. 8 are given the same symbols to omit detailed explanations.

Selector 601 outputs, based on an output from fastest timing detection section 413, a phase rotation amount of a received signal in a branch of which the symbol synchronization timing is acquired at a faster timing, i.e., either of an output of arc tangent calculator 419 or 420.

As described above, according to this embodiment, in detecting the frequency offset amount, phase rotation amounts of receives signals in all branches are not averaged, and the phase rotation amount of the received signal in the branch of which the symbol synchronization timing is acquired at a faster timing, which is considered to have a smaller error, is adopted. As a result, it is possible to improve the detection accuracy for the frequency offset amount to be compensated, and to execute accurate frequency offset compensation.

Fifth Embodiment

An OFDM reception apparatus according to this embodiment has almost the same configuration as that in the third or fourth embodiment, and adopts an averaged phase rotation amount of received signals in all branches as a frequency offset amount in the case where the symbol synchronization timings for received signals in both branches are close.

Figure 11:
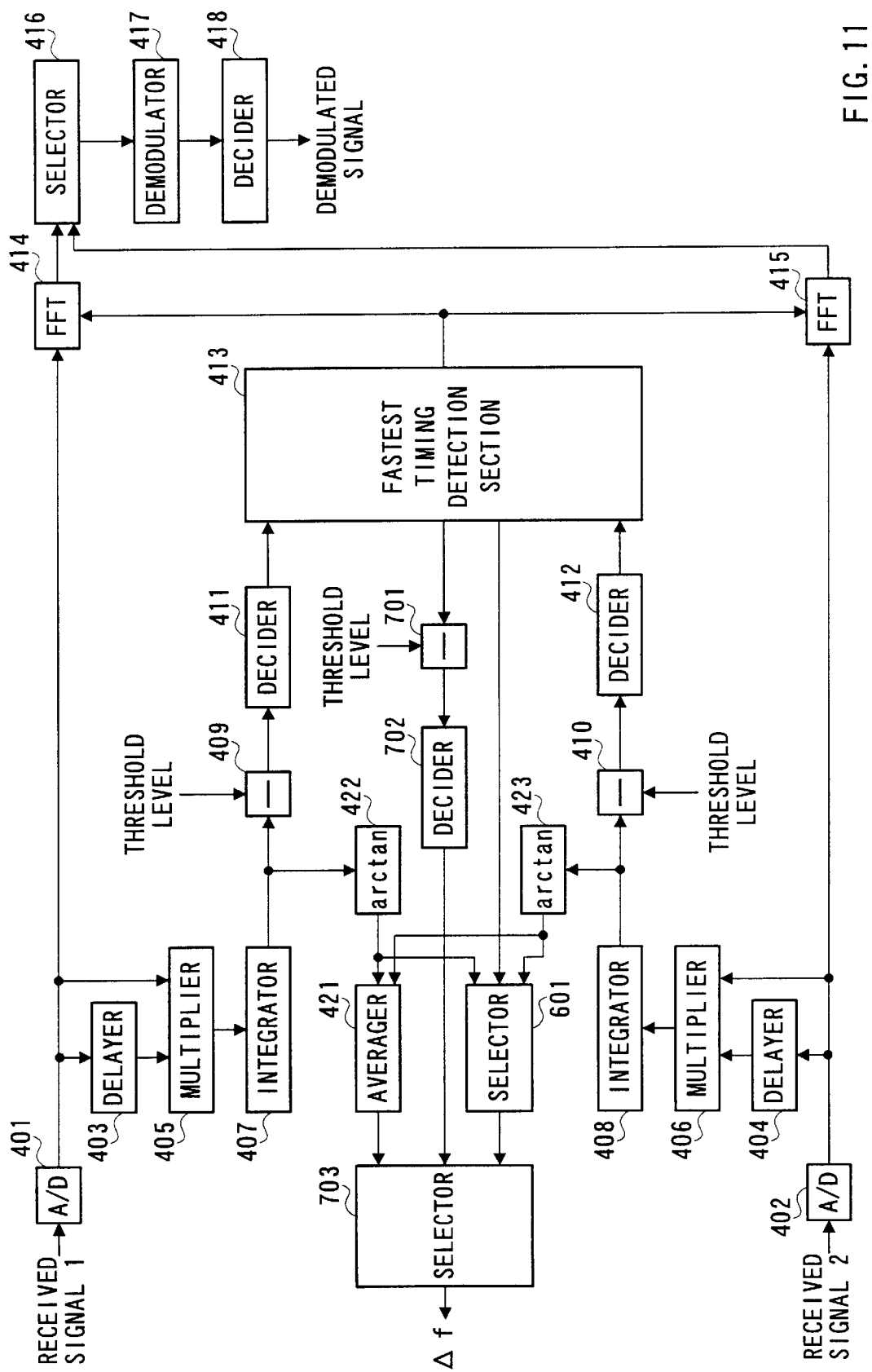
FIG. 11 is a schematic block diagram illustrating a part of a configuration of an OFDM reception apparatus according to a fifth embodiment of the present invention.

The OFDM reception apparatus according this embodiment is explained below using FIG. 11. FIG. 11 is a schematic block diagram of a part of a configuration of the OFDM reception apparatus according to the fifth embodiment of the present invention. In addition, the same blocks as those in third or fourth embodiment are given the same symbols to omit detailed explanations.

When the symbol synchronization timings of received signals in both branches are acquired at close timings, a smaller error is obtained in the case where phase rotation amounts of received signals in both branches are averaged to use like in the third embodiment than in the case where a phase rotation amount of a received signal in either branch is only used like in the fourth embodiment. Therefore, any of such cases is applied corresponding to a time interval between symbol synchronization timings for received signals in both branches.

Based on a result obtained by comparing acquisition times for symbol synchronization timings for received signals in both branches in fastest timing detection section 413, subtracter 701 subtracts an arbitrary threshold level from the time interval between both timings. Decider 702 decides whether an output from subtracter 701 is positive or negative to determine the time interval between acquisition times for symbol synchronization timings for received signals in both branches is adequately close (small time difference).

An output from decider 702 is input to selector 703 as a control signal. Selector 703 executes the control so as to output an output from averager 421 and an output from selector 601 selectively.

For example, in the case where the subtracted result is a negative value smaller than the threshold level, in other words, in the case where it is considered that the time interval between acquisition times for symbol synchronization timings for received signals in both branches is adequately close, it is considered that the timing detection accuracy is almost equal. The instruction indicative of the execution of averaging processing is provided to averager 421, and the frequency offset is obtained by the averaging processing. Selector 703 outputs a value obtained by averaging phase rotation amounts of received signals in both branches, which is output from averager 421, as the frequency offset amount.

On the other hand, when decider 702 decides that the symbol synchronization timings for received signals in both branches are not close, it is considered that the symbol synchronization timing for a received signal in either branch has a great error. Therefore, selector 703 outputs, as the frequency offset amount, an output from selector 601 which outputs, based on an output from fastest timing detection section 413, a phase rotation amount of a received signal in either branch of which the symbol synchronization timing is acquired at a faster timing than the other.

For example, in the case where the subtracted result is a negative value greater than the threshold level, in other words, in the case where it is considered that the time interval between acquisition times for symbol synchronization timings for received signals in both branches is not adequately close, it is judged that the symbol synchronization timing for a received signal in either branch has a great error. The instruction, indicative of the use of the phase rotation amount of a received signal in either branch of which the symbol synchronization timing is acquired at a faster timing than the other, is provided to selector 703. Selector 703 outputs, as the frequency offset amount, the phase rotation amount of the received signal in either branch of which the symbol synchronization timing is acquired at the faster timing than the other, which is output from selector 601.

As described above, according to this embodiment, in the case where the detected symbol synchronization timings for received signals in both branches are close, since the phase rotation amounts of receives signals in both branches are averaged and adopted as the frequency offset amount to be compensated, it is possible to improve the detection accuracy for the frequency offset amount, and further to execute accurate frequency offset compensation.

The OFDM reception apparatus of the present invention is applicable to a communication terminal apparatus such as a mobile station and a base station apparatus in a radio communication system. Since the accuracy for the symbol synchronization acquisition is thus improved, it is thereby possible to reduce errors in communications, and to improve channel qualities.

The above-mentioned explanations in the third to fifth embodiments describe about the case where the number of branches is 2, in other words, the number of branches for received signals is 2, however the present invention is applicable to the case where the number of branches is any of a plurality of numbers.

In addition, the above-mentioned explanations in the first to fifth embodiments describe about the case where the fastest timing detection section compares the counted number using the counter, however the present invention is not limited to such a case. It may be possible to apply cases other than the above-mentioned case, if it is possible in such cases to compare the timing of peak of the correlation value detected for each frame or each branch to each other, and to select the fastest timing among those to use as the symbol synchronization timing.

Further, it is possible to apply the setting method for the symbol synchronization timing described in the first and second embodiments to the case of diversity described in the third to fifth embodiments.

As described above, the OFDM reception apparatus of the present invention uses the peak detected timing for a frame of which the peak of the correlation value is detected fastest among a plurality of frames received during a predetermined time, as the symbol synchronization timing which is the timing for FFT processing initiation, and in the diversity, uses the peak detected timing for a received signal in a branch of which the peak of the correlation value is detected fastest among all received signals, as the symbol synchronization timing which is the timing for FFT processing initiation common to received signals in all branches, thereby enabling the improvement of the accuracy for the symbol synchronization acquisition, and further enabling the improvement of error rate under multipath environments.

The present invention is not limited to the above described embodiments, and various variations and modifications may be possible without departing from the scope of the present invention.

This application is based on the Japanese Patent Applications No. HEI10-336111 filed on Nov. 26, 1998 and No. HEI11-79574 filed on Mar. 24, 1999, entire content of which is expressly incorporated by reference herein.

What is claimed is:

1. An OFDM reception apparatus comprising:
   a timing detector which detects a symbol synchronization timing for each frame of a received signal composed of a plurality of frames;
   a fastest timing selector which selects a fastest symbol synchronization timing from a plurality of symbol synchronization timings detected by said timing detector during a predetermined time; and
   a Fourier transformer which executes Fourier transform processing on the received signal using the fastest symbol synchronization timing selected by said fastest timing selector as a processing initiation timing.

2. The OFDM reception apparatus according to claim 1, wherein said fastest timing selector comprises:
   a converter which converts each symbol synchronization timing detected by said timing detector into a numerical value corresponding to a fastness of the symbol synchronization timing; and
   an extractor which compares numerical values to extract the numerical value corresponding to the fastest symbol synchronization timing.

3. The OFDM reception apparatus according to claim 1, wherein said fastest timing selector comprises:
   a converter which converts each symbol synchronization timing detected by said timing detector into a numerical value corresponding to a fastness of the symbol synchronization timing;
   a storage which stores the numerical value;
   a comparator which compares the numerical value output from said converter with the numerical value read from said storage and outputs the numerical value corresponding to the faster symbol synchronization timing; and
   an update controller which updates the numerical value corresponding to the faster symbol synchronization timing to be stored in said storage.

4. An OFDM reception apparatus comprising:
   a timing detector which detects a symbol synchronization timing for each received signal received for each branch of a plurality of branches;
   a fastest timing selector which selects a fastest symbol synchronization timing from a plurality of symbol synchronization timings detected by said timing detector;
   a Fourier transform process controller which sets a symbol synchronization timing selected in said fastest timing selector as an initiation timing applied to Fourier transform processing of the received signal in each branch; and
   a demodulator which selects a received signal to be demodulated, which is highest among the received signals in the respective branches subjected to the Fourier transform processing.

5. The OFDM reception apparatus according to claim 4, wherein said fastest timing selector comprises:
   a converter which converts each symbol synchronization timing detected by said timing detector into a numerical value corresponding to a fastness of the symbol synchronization timing; and
   an extractor which compares numerical values to extract the numerical value corresponding to the fastest symbol synchronization timing.

6. The OFDM reception apparatus according to claim 4, further comprising:
   a phase rotation amount calculator provided for each branch which calculates a phase rotation amount of a received signal in each branch; and
   a frequency offset compensator which executes frequency offset compensation on the received signals in all branches based on the phase rotation amount of the received signal in the branch with a symbol synchronization timing selected by said fastest timing selector.

7. The OFDM reception apparatus according to claim 6, further comprising:
   an averager which averages phase rotation amounts of the received signals in respective branches, said phase rotation amounts being output from said phase rotation amount calculator;
   a decider which decides whether or not a difference between symbol synchronization timings of received signals in respective branches is more that a predetermined level; and
   a controller which, based on the decision of said decider, controls said frequency offset compensator to execute frequency offset compensation on received signals in all branches based on the phase rotation amount of the received signal in the branch with the symbol synchronization timing selected by said fastest timing selector when the difference between symbol synchronization timings is equal to or more than the predetermined level, and controls said frequency offset compensator to execute the frequency offset compensation on received signals in all branches based on the averaged phase rotation amount when the difference between symbol synchronization timings is less than the predetermined level.

8. A symbol synchronization error reduction method comprising:
   detecting a symbol synchronization timing for each frame of a received signal composed of a plurality of frames;
   selecting a fastest symbol synchronization timing from a plurality of symbol synchronization timings detected by the detecting during a predetermined time; and
   executing Fourier transform processing on the received signal using the fastest symbol synchronization timing selected by the selecting as a processing initiation timing.

9. The symbol synchronization error reduction method according to claim 8, wherein in the selecting, each symbol synchronization timing detected by the detecting is converted into a numerical value corresponding to a fastness of the symbol synchronization timing, and by comparing numerical values, the numerical value corresponding to the fastest timing detected by the detecting is extracted.

10. The symbol synchronization error reduction method according to claim 8, wherein in the selecting, each symbol synchronization timing detected by the detecting is converted into a numerical value corresponding to a fastness of the symbol synchronization timing, the numerical value is stored, the numerical value is compared to the stored numerical value, the numerical value corresponding to the faster symbol synchronization timing is output, and the numerical value corresponding to the faster symbol synchronization timing is updated and stored.

11. A symbol synchronization error reduction method comprising:

detecting a symbol synchronization timing for each of received signals received for each branch of a plurality of branches;

selecting a fastest symbol synchronization timing from a plurality of symbol synchronization timings detected by the detecting;

setting a symbol synchronization timing, selected by the fastest symbol synchronization timing selecting, as an initiation timing applied to Fourier transform processing of the received signal in each branch; and selecting a received signal for demodulation, of which a received level is highest among the received signals in respective branches subjected to the Fourier transform processing.

12. The symbol synchronization error reduction method according to claim 11, wherein in the fastest symbol synchronization timing selecting, each symbol synchronization timing detected by the detecting is converted into a numerical value corresponding to a fastness of the symbol synchronization timing, and by comparing the numerical values, the numerical value corresponding to the fastest symbol synchronization timing detected in the detecting is extracted.

13. The symbol synchronization error reduction method according to claim 11, wherein a phase rotation amount of a received signal in each branch is calculated, and based on the phase rotation amount of the received signal in the branch with a fastest symbol synchronization timing selected by the fastest symbol synchronization timing selecting, frequency offset compensation is executed on received signals in all branches.

14. The symbol synchronization error reduction method according to claim 13, wherein the phase rotation amounts of the received signals in respective branches are averaged, and it is determined whether a difference between symbol synchronization timings of received signals in respective branches is more than a predetermined level, the timings being output from the detecting step, and based on the determination, frequency offset compensation is performed on received signals in all branches based on the phase rotation amount of the received signal in the branch with the selected fastest symbol synchronization timing, when the difference between symbol synchronization timings is equal to or more than the predetermined level, and the frequency offset compensation is performed on received signals in all branches based on the average phase rotation amount, when the difference between symbol synchronization timings is less than the predetermined level.

\* \* \* \* \*